United States Patent [19]
Dozier

[11] Patent Number: 4,507,929
[45] Date of Patent: Apr. 2, 1985

[54] METHOD AND INSTALLATION FOR MONITORING THE TEMPERATURE IN A GREENHOUSE

[75] Inventor: José J. Dozier, Montigny-Le-Tilleul, Belgium

[73] Assignee: Delta Recherche et Developpement, Sion, Switzerland

[21] Appl. No.: 438,854

[22] PCT Filed: Feb. 12, 1982

[86] PCT No.: PCT/BE82/00001
§ 371 Date: Oct. 20, 1982
§ 102(e) Date: Oct. 20, 1982

[87] PCT Pub. No.: WO82/02816
PCT Pub. Date: Sep. 2, 1982

[51] Int. Cl.³ .................. F25B 27/02; A01G 9/00
[52] U.S. Cl. ........................ 62/79; 62/238.6; 47/17; 236/49
[58] Field of Search ............ 236/49; 237/2 B; 62/238.6; 47/17; 98/33 A; 119/16

[56] References Cited
U.S. PATENT DOCUMENTS 3,492,934 2/1970 Steigerwald .................. 98/33 A
4,142,576 3/1979 Perry et al. ..................... 62/238.6
4,315,597 2/1982 Garraffa, Jr. ..................... 237/2 B Primary Examiner—William E. Wayner
Attorney, Agent, or Firm—Schwartz, Jeffery, Schwaab, Mack, Blumenthal & Koch

[57] ABSTRACT

The invention pertains to a method for regulating the temperature in a greenhouse by insufflation of cooled air into the upper portion of the greenhouse, in case of overheating, and by heating of the lower portion of the greenhouse, in case of a cooling down of same, characterized in that it consists, in the case of overheating, in aspirating the warm air from the upper portion of the greenhouse; to cool this air down by means of a heat pump to a temperature of from about 8° to 15° C. below its initial temperature; to send this cooled down air, eventually with an addition of fresh air, in the upper portion of the greenhouse towards the top of the latter, in order not to perturb the lower area, while for reheating one uses the calories stocked by means of the above mentioned cooling process in at least one low temperature heating circuit provided for with this purpose in mind in the greenhouse. The invention relates also to installations for applying this method.

9 Claims, 2 Drawing Figures 4,507,929

METHOD AND INSTALLATION FOR MONITORING THE TEMPERATURE IN A GREENHOUSE

BACKGROUND OF THE INVENTION

The present invention relates to a method and an installation for regulating the temperature in a greenhouse.

The way in which to obtain and to maintain favorable climatic conditions in a greenhouse has been the object of a great number of studies and experiments. Amongst the many difficulties encountered, one of the most arduous is the one of the cooling down of the greenhouse when the temperature threatens to rise above a limit value, depending on the type of culture which is being practised. As a matter of fact, without special precautions, the temperature inside a greenhouse can rise very rapidly under the action of the solar radiations, resulting in the destruction of the plants. Therefore, the green houses have been generally equipped with opening aeration devices, shading veils and forced ventilation installations. The latter consist of a device intended for blowing into the lower part of the greenhouse or culture area a strong current of air which passes through a waterscreen at the entrance of the greenhouse.

SUMMARY OF THE INVENTION

The applicant has established that installations of this kind have many drawbacks, amongst others the drawback of submitting the plants, especially the ones that are located near to the blower, to a rather steep fall in temperature, and to cause an important evaporation, which is disasterous to their growth.

Moreover, the prolonged use of shading veils and similar devices is also unfavorable in that it considerably limits the quantity and nature of the radiations which are required for an intensive culture.

These problems become more complicated still, due to the fact of the present cost of energy, which has become a significant factor in the choice of the solutions.

The object of the invention is to provide for a new method for regulating the temperature and mainly for controlling the maximum temperature allowed in a greenhouse.

According to the invention, this method consists at least in generating, as soon as the temperature attains a predetermined value in one or more selected points of the greenhouse, a buffer area in the upper portion of the greenhouse, by blowing air at a temperature which is lower than the said predetermined value.

The installation for applying this method comprises: a device for insufflating air into the upper portion of the greenhouse; a device for cooling the air before it becomes insufflated; and a monitoring device by which the aforesaid in sufflating device and/or the aforesaid cooling device are brought under control, as a function of the temperature of the greenhouse.

BRIEF DESCRIPTION OF THE DRAWINGS

For more clearness, the invention is described hereinafter, reference being made to the attached drawings, in which.

Figure 1:
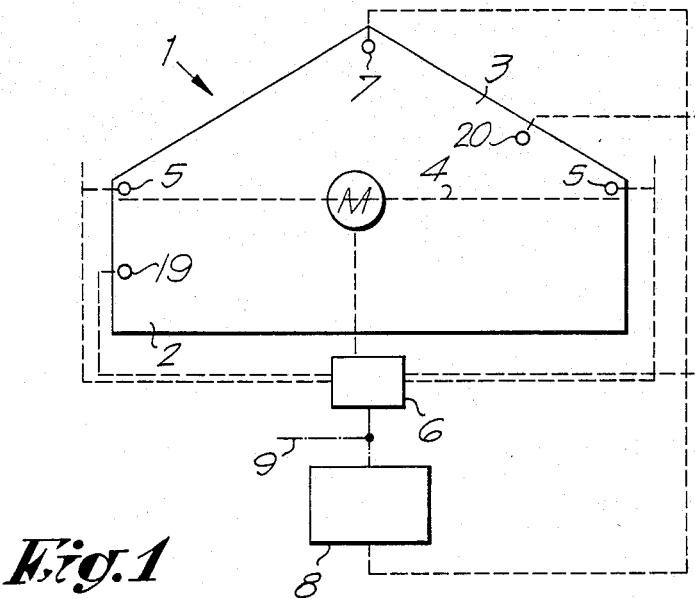
FIG. 1 is a sketch-plan of the air circuit of a greenhouse equipped according to the invention.

The sketch-plan of FIG. 1 shows a greenhouse 1, comprising a culture area 2 and an upper portion 3, between which a shading veil 4 can be spread out.

The method according to the invention thus consists of generating in the upper portion 3 a buffer area by insufflating air therein as soon as the temperature measured in one or more points of the greenhouse reaches a predetermined value. The insufflated air must be at a temperature which is — for instance 5 to 15° C. — lower than the aforesaid predetermined temperature.

In order to achieve this, one or more conduits 5 are provided for in the upper portion 3 of the greenhouse, these conduits having vent-holes substantially directed towards the top of the aforesaid upper portion.

These conduits 5 are fed by a blower 6.

In order to obtain air at the temperature which is required for generating a buffer area in the upper portion 3, it is advantageous to extract air from the latter, for instance by means of a conduit 7, to cool this air down by means of a frigorific set, respectively a heat pump 8, and to send it back to the conduits 5. In this way one can have a completely closed circuit or, also, have a mixed circuit, one part of the insufflated air being recycled and the remainder being fresh air, taken outside, for instance through a piping 9, in order to take the physiological needs of the plants into consideration.

It may be advantageous to spread out the shading veils 4 before proceeding to the insufflation of air to the formation of the aforesaid buffer area, and to furl them again at least partially when the latter is well established.

It is desirable to measure the temperature gradient between at least two points 19, 20 in the culture area 2 and in the upper portion 3 respectively and to regulate the insufflation of air depending on this gradient, according to a law to be experimentally determined depending on the parameters which are proper to the greenhouse under consideration, such as the dimensions and inner volume of the greenhouse, the thermal insulation and permeability to air of the latter, its implantation, the culture which is contemplated, etc. The expression "gradient" used hereinabove should be understood in a broad sense and is not limited to a continuous measure between two end points but also covers an approximation of this measure.

The buffer area generated in this way maintains the culture area 2 at a fairly constant temperature, whilst the plants are not exposed to draughts and/or to abrupt cooling down processes.

The method described hereinabove and installation for its use also allow a very favorable thermal care of the greenhouse.

As a matter of fact, when the air coming from the upper portion 3 cools down, before its recycling, the calories removed can be recovered. For instance, if the heat pump 8 is of the air/water type, the reheated water may be sent into a stocking tank 10 in order to be used subsequently for heating the greenhouse.

The pump 8 can advantageously be driven by a thermal, water-cooled motor 11, the calories of which can also be recovered, as can the calories of the exhaust gases and lubricants.

Figure 2:
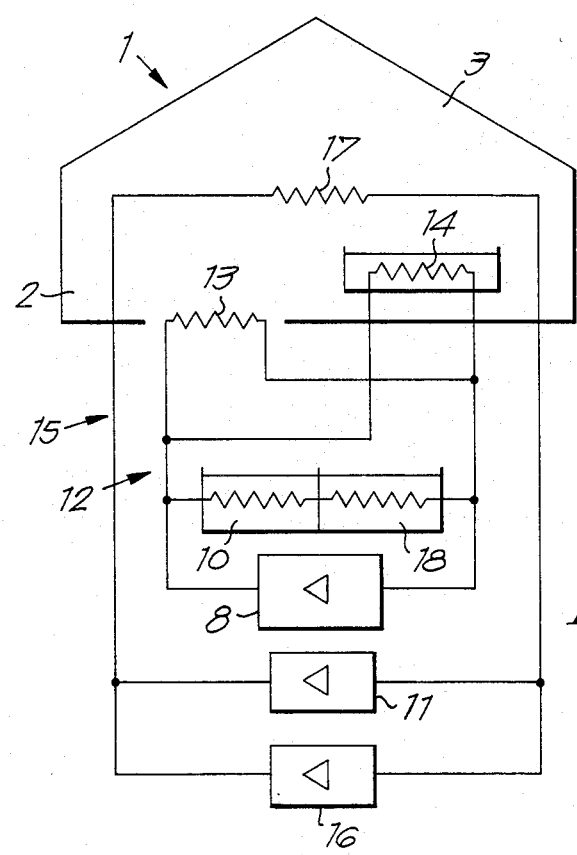
FIG. 2 is a sketch-plan of a hydraulic heating circuit, which can advantageously be superimposed on the sketch-plan of FIG. 1.

A sketch-plan of the heating portion of the installation is shown on FIG. 2.

One can see thereon a "low temperature" circuit 12, fed from pump 8 and/or tank 10, and intended for heating the soil 13 and culture beds 14, respectively the culture grounds. One can also see a "high temperature" circuit 15, fed from a thermal motor 11, (via a tank which is not shown) and from an auxiliary boiler 16, circuit that comprises radiant tubes 17 which are suspended in the greenhouse.

The return product of circuit 12 can, at least partly, be stocked in a tank 18, in order to be used subsequently for watering.

From the preceding text, one will easily understand the advantage of the invention, not only as far as the culture is concerned, but also as far as the consumption of energy is concerned.

It is clear that the invention can be applied in quite various shapes without therefore going outside the scope of the attached claims. So it is that the number and arrangement of the air insufflation and extraction sheaths, the selection of the heat pump or frigorific equipment type, the way in which the calories are stocked, etc. may vary from one case to another, according to particular requirements.

What I claim is:

1. A method for regulating the temperature in a greenhouse by insufflation of cooled air into the upper portion of the greenhouse, and by heating of the lower portion of the greenhouse, comprising the steps of:
    (a) aspirating warm air from the upper portion of the greenhouse;
    (b) cooling the aspirated air by about 5° to 15° C. by means of a heat pump provided with a thermal reservoir for the storage of the energy removed from said warm air;
    (c) mixing the cooled air with fresh air and returning it to a different point in the upper portion of the greenhouse; and
    (d) circulating warm fluid from the thermal reservoir through at least one low temperature heating circuit located within said greenhouse.

2. A method for regulating the temperature in a greenhouse according to claim 1, wherein one measures the temperature gradient between at least a lower point and a higher point of the greenhouse and one regulates the air insufflation in the upper portion of the greenhouse depending on this gradient, according to a law which is experimentally determined as depending on the parameters proper to the greenhouse under consideration.

3. Method according to claim 2 characterized in that, the greenhouse being equipped with a shading veil, one spreads out this veil before effecting the aforesaid insufflation above this veil.

4. Method according to claim 1, characterized in that, the greenhouse being equipped with a shading veil, one spreads out this veil before effecting the aforesaid insufflation above this veil.

5. Installation for monitoring the temperature in a greenhouse comprising a device for insufflating air into the upper portion of the greenhouse; a device for cooling down the air before it becomes insufflated; and a regulating device capable of controlling said insufflation and cooling device, depending at least on the temperature in the greenhouse, wherein the cooling device is an air/water heat pump, a water tank being provided to stock the water heated in the course of the functioning of the aforesaid pump, this tank being connected with a heating circuit of the greenhouse.

6. Installation according to claim 5, wherein the aforesaid heat pump is being driven by a heat engine, the cooling circuit of which is connected with the aforesaid tank.

7. Installation according to claim 5, intended for equipping a greenhouse provided with a shading veil driven by a motor, characterized in that the drive of the aforesaid veil is brought under control of the aforesaid monitoring device.

8. An installation as in claim 5, further comprising a second water tank, wherein said second tank is connected with the cooling circuit of a heat engine used to drive said heat pump, and with a heating circuit of the greenhouse.

9. An installation as in claim 5, wherein the tank is connected to a watering circuit of the greenhouse.

* * * * *